(12) United States Patent
Radovic

(10) Patent No.: US 8,373,403 B1
(45) Date of Patent: Feb. 12, 2013

(54) CIRCUIT FOR CONTROLLING SYNCHRONOUS RECTIFIERS DURING START-UP INTO PRE-BIASED OUTPUT VOLTAGE

(75) Inventor: Milorad Radovic, Vista, CA (US)

(73) Assignee: Power-One, Inc., Camarillo, CA (US)

( * ) Notice: Subject to any disclaimer, the term of this patent is extended or adjusted under 35 U.S.C. 154(b) by 638 days.

(21) Appl. No.: 12/500,741

(22) Filed: Jul. 10, 2009

Related U.S. Application Data

(60) Provisional application No. 61/087,502, filed on Aug. 8, 2008.

(51) Int. Cl.
*G05F 1/00* (2006.01)
(52) U.S. Cl. .................................................. 323/284
(58) Field of Classification Search .......... 323/282–285; 363/49
See application file for complete search history.

(56) References Cited

U.S. PATENT DOCUMENTS

| | | | |
|---|---|---|---|
| 5,774,350 A * | 6/1998 | Notaro et al. ................... 363/89 |
| 6,583,993 B2 * | 6/2003 | Hua ........................... 363/21.06 |
| 6,674,658 B2 * | 1/2004 | Mao et al. ....................... 363/127 |
| 6,711,039 B2 | 3/2004 | Brkovic |
| 6,760,235 B2 | 7/2004 | Lin et al. |
| 6,841,977 B2 | 1/2005 | Huang et al. |
| 6,980,441 B2 | 12/2005 | Man ho |
| 7,045,992 B1 | 5/2006 | Silva et al. |
| 7,109,688 B1 | 9/2006 | Chiu et al. |
| 7,304,868 B2 * | 12/2007 | Aso et al. .................... 363/21.06 |
| 7,342,383 B1 | 3/2008 | Song et al. |
| 2004/0169498 A1 | 9/2004 | Goder et al. |
| 2007/0064454 A1 | 3/2007 | Chen et al. |
| 2008/0012540 A1 | 1/2008 | Chen |

* cited by examiner

*Primary Examiner* — Jue Zhang
(74) *Attorney, Agent, or Firm* — Waddey & Patterson, P.C.; Mark J. Patterson; Gary L. Montle

(57) ABSTRACT

A power supply includes circuitry for gradually enabling switching rectifiers during a startup condition without drawing current from a pre-biased power supply output. A driver provides a control signal to synchronous rectifier. A driver supply circuit is coupled across the driver and has a first input receiving pulse signals provided by a pulse modulation controller, an output providing supply voltage to the driver, a second input receiving driver supply input voltage, and circuitry defining a time constant. The circuitry includes a first switching element that turns on when pulse signals are provided and a second switching element connected to the output. The time constant is associated with a rise time for the power supply, and defined by selected component values, such that the second switching element only becomes fully conductive after elapsing of the time constant.

19 Claims, 6 Drawing Sheets

CIRCUIT FOR CONTROLLING SYNCHRONOUS RECTIFIERS DURING START-UP INTO PRE-BIASED OUTPUT VOLTAGE

CROSS-REFERENCES TO RELATED APPLICATIONS

This application claims benefit of the following patent application(s) which is/are hereby incorporated by reference: U.S. Provisional Patent Application No. 61/087,502 filed Aug. 8, 2008.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to switched-mode power converters with circuitry controlling synchronous rectification. More particularly, the present invention relates to circuits for controlling the operation of synchronous rectifiers during a startup condition into pre-biased output voltage such that reverse current flow is reduced or eliminated.

DC-DC power converter devices are currently applied in numerous applications of power systems. These converters are electronic devices that convert a direct current (DC) input voltage into a predetermined, or nominal, DC output voltage. A typical isolated DC-DC converter includes a transformer with primary and secondary windings about a common magnetic core. A typical non-isolated converter does not require a transformer, but may instead comprise a simple DC input terminal. In either case, one or more power switches are provided that may be opened and closed to control energy transfer. In various examples of DC-DC converters, such as 5V or 12V output converters previously in common use, free-wheeling diodes were used to prevent reverse current flow from the converter output into the switching circuitry when a switch was closed. However, the use of diodes to perform this function resulted in significant inefficiencies such as power loss. These inefficiencies are even more significant in a relative sense for low output voltage converters and power supplies.

Synchronous rectification has become a desirable alternative to free-wheeling diodes in power converters due to the increased power conversion efficiency that results at least in part from reduced power losses and higher density. However, while free-wheeling diodes only permit current flow in one direction, synchronous rectifiers such as bipolar transistors, MOSFETs, or other equivalent semiconductor switches permit current flow in either direction. As a result, such converters may have both current-sourcing and current-sinking functions.

A problem common to many output power stages of power supplies employing synchronous rectification is therefore the drawing of current from a pre-existing voltage, or pre-biased output voltage, also known as reverse bias or back bias, during certain sequences such as startup or shutdown conditions. Pre-biased voltage may come from other power sources in a non-isolated system, or may come from a load. During a soft-start condition, the synchronous rectifiers may have a high duty ratio for the duration of the output voltage rise time of the power supply. Where a pre-biased voltage exists, a negative current may then be built in the filtering inductor, which may cause the output voltage to drop and correspondingly disturb other elements in the system.

FIG. 1 shows a typical prior art circuit for providing bias voltage to the synchronous rectifier driver 18 in a non-isolated converter. Q1 in this example represents a control rectifier while Q2 represents a synchronous rectifier.

FIG. 2 shows a typical prior art circuit for providing bias voltage to the synchronous rectifier driver 18 in an isolated converter. Q1 and Q2 in this example both represent synchronous rectifiers.

In either circuit as shown, the output voltage is measured across a filtering LC circuit and fed back to an error amplifier 14. The error amplifier 14 compares the feedback voltage to a reference voltage. During normal operation the error amplifier 14 may then produce no further signals, but during predetermined conditions such as a system startup for example the error amplifier 14 may instead provide a signal to the pulse width modulator (PWM) controller 16, which supplies a series of pulse signals to the driver 18 indicative of the condition. The driver 18 then provides control signals to rectifiers Q1, Q2 based on the pulse signals from the PWM controller 16 and having an amplitude associated with a driver supply input voltage V_driver.

However, immediately enabling the rectifiers Q1, Q2 in the presence of pre-biased voltage leads to reverse current flow of the inductor current. During the output voltage rise time period that is inherent to the specific power device, the reverse current flow is a significant problem as described above. Some prior art circuits have addressed this problem with circuits and methods that are undesirable for certain applications because they require additional circuitry for detecting system parameters or voltage clamping. These are generally impracticable where less space is physically available on a circuit board, and also cause additional problems due to increased numbers of components and cost.

Therefore, it is desirable that a circuit be provided for controlling synchronous rectifiers in a manner that reduces or eliminates reverse bias current draw.

It is further desirable that a circuit be provided for providing the above capabilities during a predetermined condition such as a soft start period for a power converter.

It is further desirable that the circuit efficiently and cost-effectively provide the above capabilities, with the ability to design for a broad range of foreseeable applications and outputs.

BRIEF SUMMARY OF THE INVENTION

A modified drive supply circuit of the present invention is provided for use in a power device such as a power converter for controlling the operation of one or more synchronous rectifiers during startup of the device into a pre-biased output voltage. The rectifiers are only gradually enabled during a predetermined condition such as a soft-start condition where reverse current draw may otherwise be particularly problematic. By controlling the gate-source voltage for the rectifiers, operation of the rectifiers is only enabled when the output voltage exceeds the pre-biased voltage. During the time period prior to fully conductive operation, the synchronous rectifiers present significant resistance to the reverse current flow. The modified drive supply circuit defines a time constant before bias voltage signals are fully supplied to the driver from the modified drive supply circuit, such that during the output voltage rise time for the power device the synchronous rectifiers are therefore turned on slowly and not fully conductive.

Briefly stated, in one aspect of the modified drive supply circuit a first input terminal is provided for receiving pulse inputs from a pulse width modulator that are generated upon detection of a predetermined condition such as a soft-start condition. A first switching element such as for example a n-channel transistor is connected to the first input terminal and operable to turn on when pulse inputs are supplied. A second input terminal is provided for receiving a constant driver supply input voltage. A capacitor is operable to begin charging to the driver supply input voltage when the first switching element is turned on in response to the pulse input signals. A second switching element such as for example a p-channel transistor is connected to a circuit output terminal and has a threshold voltage. The second switching element is further connected to the capacitor and operable to turn on when the threshold voltage is exceeded by the voltage across the capacitor.

The time constant is defined by circuit components coupled to the driver supply input voltage and the second switching element, and selected such that the second switching element is slowly turned on by going through its linear conductive region. The threshold voltage is ideally such that the second switching element does not turn on too soon and is therefore able to go through the linear conduction region on its way to a fully conductive state.

The modified drive supply circuitry further includes a voltage divider connected to the second input terminal, with the time constant defined by values of the voltage divider and the capacitor. The voltage divider in one embodiment includes a first resistor and a second resistor connected in series between the second input terminal and the second switching element, the first resistor further coupled in parallel with the capacitor. The capacitor charges to a voltage defined by the driver supply input voltage, voltage divider and capacitor values. The second switching element gradually turns on while the voltage charging across the capacitor rises, and becomes fully conductive with elapsing of the time constant. The modified drive supply circuit may further include a resistor coupled in parallel across the drain and the source of the second switching element so as to compensate for non-linear on-resistance to gate-source voltage characteristics present.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data or other signal. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa. The term "pre-biased output voltage" means at least an output voltage that has a non-zero value prior to active regulation.

Referring generally to FIGS. 4-7, a power system having a power device 100 or converter 100 including a modified drive supply circuit 103 for controlling one or more synchronous rectifiers during start-up into pre-biased output voltage is described. Broadly stated, the modified drive supply circuit 103 regulates the bias voltage provided to the driver and indirectly regulates the control signals provided to the synchronous rectifiers, such that the rectifiers are only gradually turned on and present sufficient resistance to the pre-biased output voltage to prevent reverse current flow. This gradual enablement is made possible by arranging the modified drive supply circuitry such that a time constant must elapse prior to the power device output voltage reaching its nominal value, the time constant generally associated with or coincident with the predetermined output voltage rise time for the power device 100.

Figure 1:
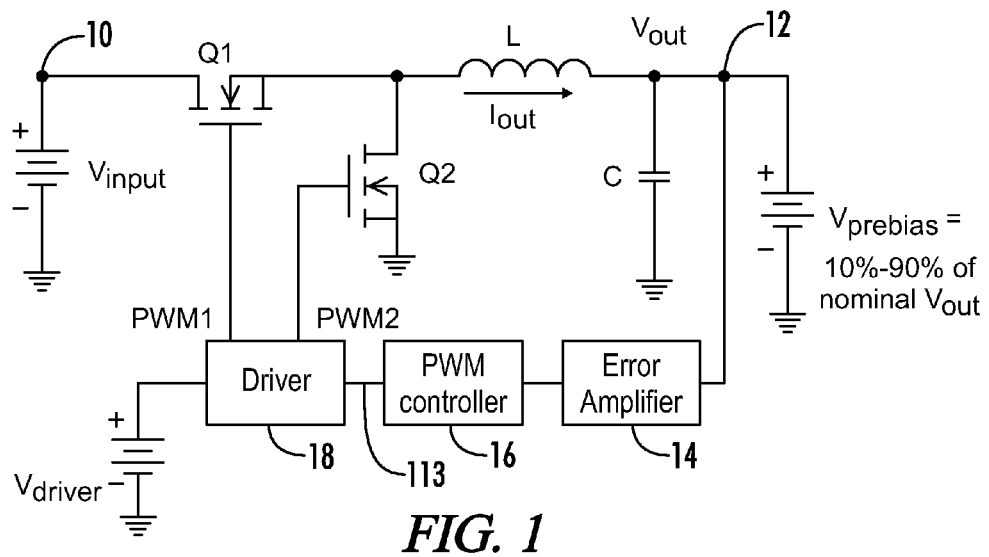
FIG. 1 is a schematic of a prior art circuit used to provide bias voltage to the driver in a non-isolated case.
Figure 2:
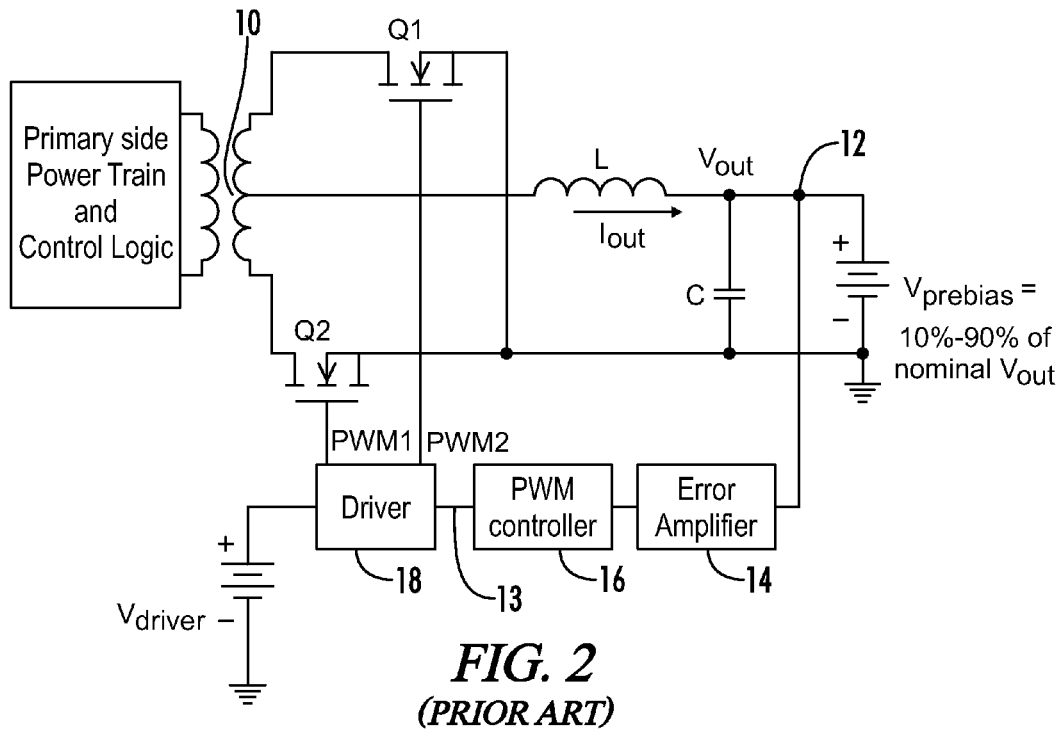
FIG. 2 is a schematic of a prior art circuit used to provide bias voltage to the driver in an isolated case.
Figure 3:
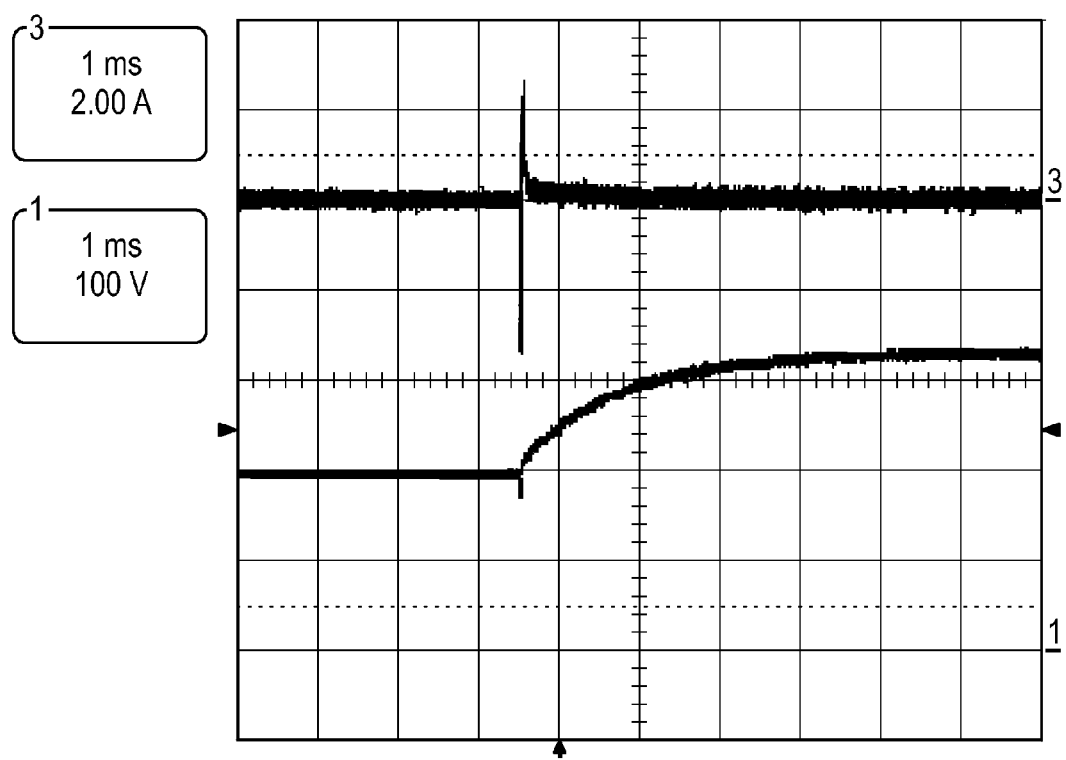
FIG. 3 is a timing diagram of waveforms of V_out and Iout for the prior art embodiments of FIGS. 1-2 during startup into pre-biased V_out equaling 60% of nominal V_out.
Figure 4:
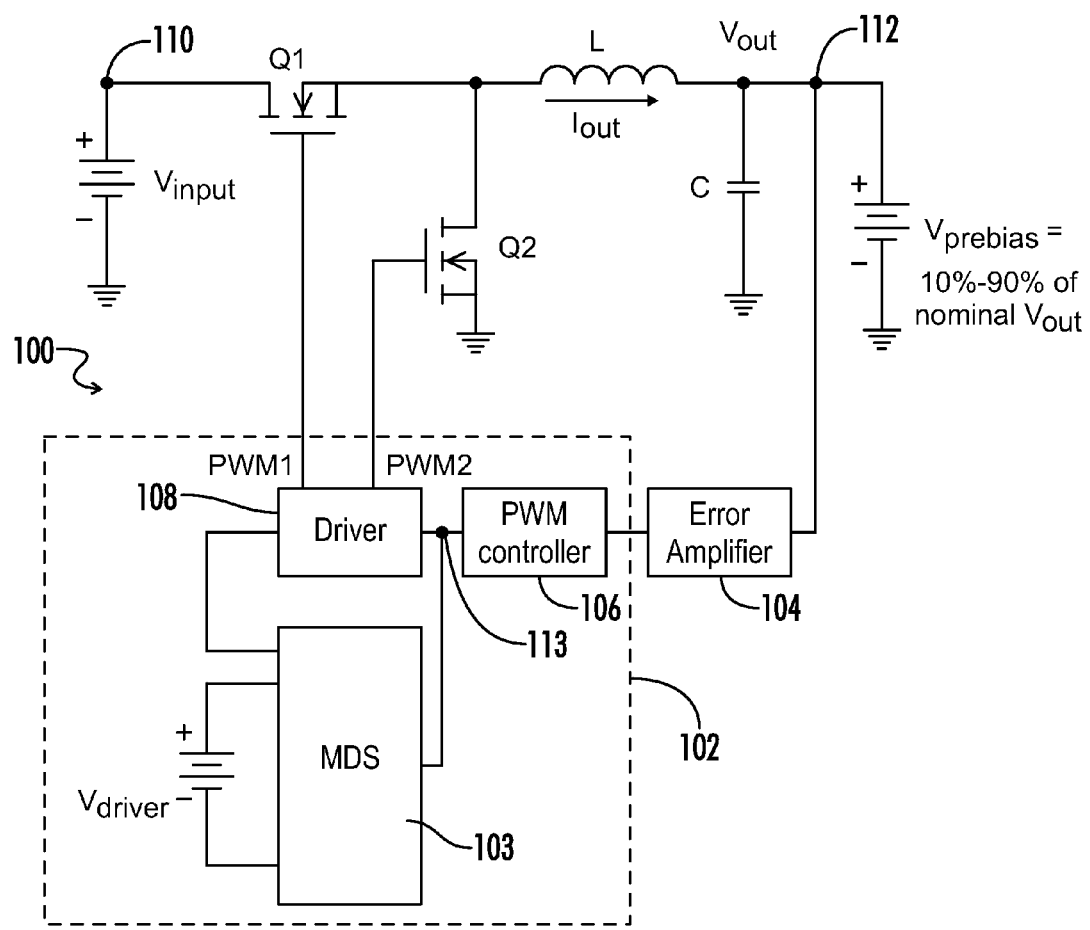
FIG. 4 is a schematic and block diagram of an embodiment of the present invention providing bias voltage to the driver in a non-isolated case.

In an embodiment as shown for example in FIG. 4, a power system includes a non-isolated power device 100 or converter 100 that further includes an input terminal 110 to which an input voltage V_input may be provided relative to ground, an output terminal 112 where an output voltage V_out having a nominal value may be provided relative to ground, a switching rectification circuit comprising control rectifier Q1 and synchronous rectifier Q2, and a control circuit 102 or switching rectification control circuit 102, further including a pulse width modulation (herein "PWM") controller 106 and switch driver 108 or switching rectification driver 108 (herein "driver").

Figure 5:
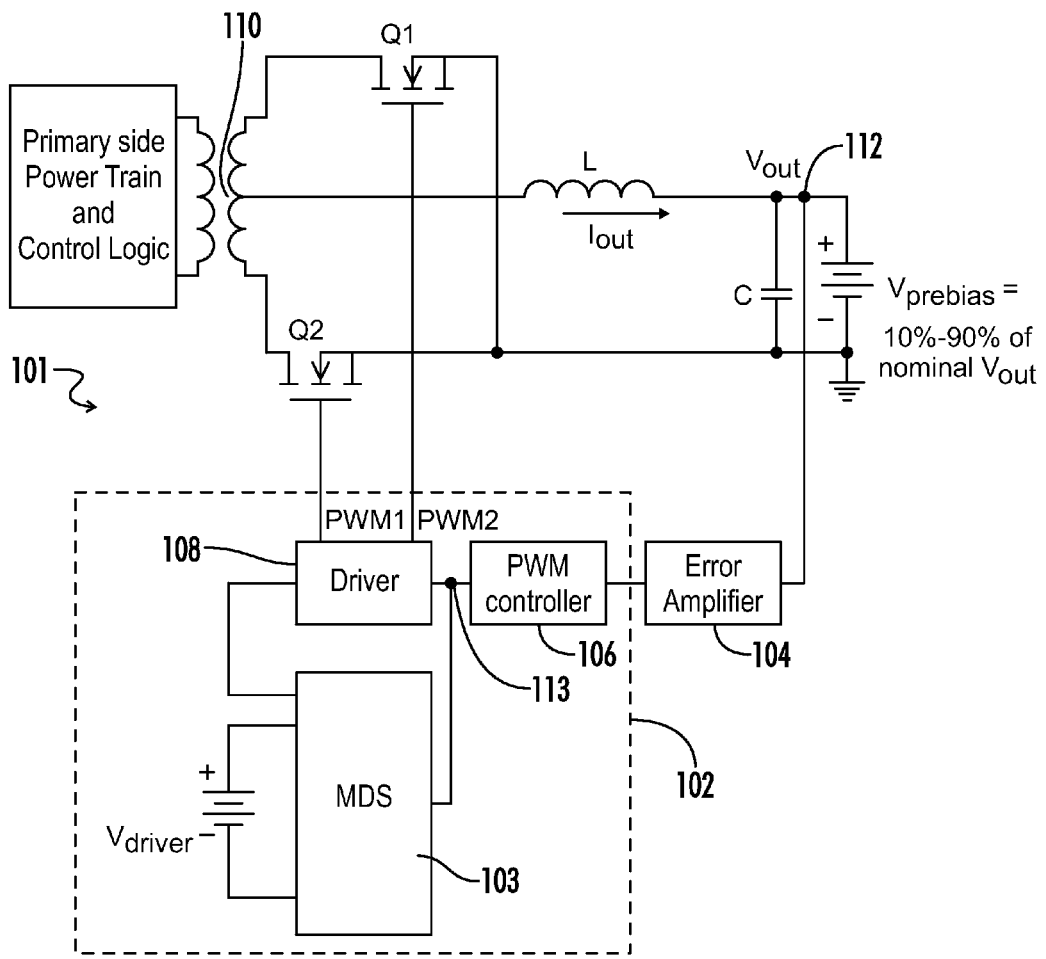
FIG. 5 is a schematic and block diagram of another embodiment of the present invention providing bias voltage to the driver in an isolated case.

In an embodiment as shown in FIG. 5, the power system is an isolated power device 101 or converter 101 having two synchronous rectifiers Q1, Q2. Various other aspects of the non-isolated converter 100 and the isolated converter 101 are sufficiently similar as to not require further description. For the remainder of this description, the converters 100, 101 will be commonly referred to such that one or more synchronous rectifiers Q1, Q2 are being controlled by the driver 108 depending on the particular application in question. Operation of the present invention is likewise independent of the particular application and may be described with reference to either the non-isolated 100 or the isolated 101 power devices.

Referring now to FIGS. 4-5, the converter 100, 101 may have an error amplifier 104 coupled between the output voltage V_out and the PWM controller 106 for sensing various conditions indicative of operation of the power system and indicating said conditions to the PWM controller 106. Such components are well known in the art and are not described further herein, their operation being substantially independent of the inventive features of the present invention.

The converter 100, 101 as shown further provides a pre-biased output voltage between V_out and ground having a value of approximately 10%-90% the nominal V_out. The pre-biased output voltage may of course have values outside of the range shown, according to the application. The following system and component descriptions are addressed to the example shown but may be adjusted as desired to accommodate actual pre-biased output voltages of any value.

The PWM controller 106 is effective to begin generating PWM pulse signals at a PWM controller output upon receiving enable signals indicative of startup of the power device. Operation of the PWM controller 106 and various embodiments of structure for the PWM controller 106 are not described further herein, being substantially independent of the inventive features of the present invention.

The driver 108 is effective to receive the PWM pulse signals at a first driver input, and to provide driver signals PWM1, PWM2 at a driver output for controlling the state of the one or more synchronous rectifiers Q1, Q2 as is well known in the art. Operation of the driver 108 and various embodiments of structure for the driver 108 are not described further herein, being substantially independent of the inventive features of the present invention.

The one or more synchronous rectifiers Q1, Q2 are thereby arranged to open and close based on control signals provided by the driver 108. Prior to startup, the control signals are not provided at all. In this state, the rectifiers Q1, Q2 are off. Upon startup, the rectifiers Q1, Q2 are gradually turned on and during this time they present significant resistance to current flow from the pre-biased output. Therefore, reverse current flow from the pre-biased output during startup is effectively prevented or substantially reduced.

The precise arrangement of the elements of FIGS. 4-5 as previously described is not limiting on the scope of the invention but is presented as context within which a certain embodiment of the invention may be used. Various alternative elements or embodiments may perform similar functions in manners known in the art in conjunction with, and without unduly limiting the applications of, the modified drive supply circuit further disclosed below.

Referring again to FIGS. 4-5, the switching rectification circuit 102 or synchronous rectification circuit 102 further includes a modified drive supply circuit 103 coupled to the driver 108. The modified drive supply circuit 103 may be coupled to a node 113 further coupled to the PWM controller output and the driver input such that the drive supply circuit 103 is effective to receive PWM pulse signals from the PWM controller 106. Subsequent to receiving the PWM pulse signals, the modified drive supply circuit 103 provides a driver supply signal to the driver 108 such that the driver 108 is effective to provide control signals to the rectifiers Q1, Q2.

The driver supply signal provided to the driver has an amplitude associated with the control signals subsequently provided by the driver to the one or more synchronous switches Q1, Q2 or rectifiers Q1, Q2. Rather than provide the full driver supply signal to the driver 108 immediately however, the modified drive supply circuit 103 further includes driver supply control circuitry arranged such that the full driver supply signal is not provided until a predetermined time period has elapsed. During the period of the time constant, which should coincide with the output voltage rise time for the power device 100 generally, the driver supply signal is instead gradually supplied so as to maintain significant on-resistance of the rectifiers Q1, Q2. The time constant begins to toll at the first appearance of pulse signals at the first input terminal, and represents the minimum allowable time between the receiving of the pulse signals and the providing of the full driver supply signal to the driver 108.

Figure 6:
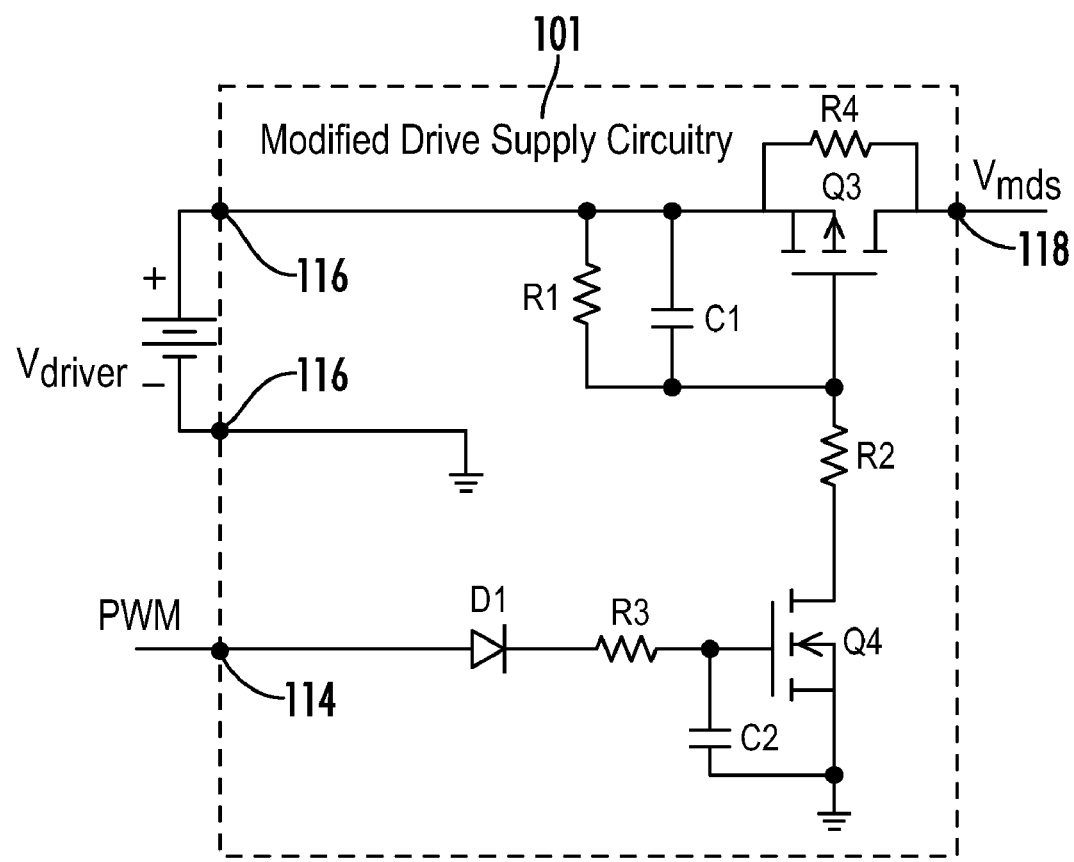
FIG. 6 is a schematic of an embodiment of the modified drive supply circuit of FIGS. 4-5.

Referring now to FIG. 6, one embodiment of the modified drive supply circuit 103 is shown. A first input terminal 114 is effective to receive pulse input signals generated when the predetermined condition is present. The pulse signals may in certain embodiments as shown in FIGS. 4-5 be generated by the PWM controller 106. The first input terminal 114 may be coupled to a first switching circuit comprising in an embodiment as shown D1, R3, C2 and first switching element Q4. A second input terminal 116 is effective to receive a driver supply input voltage V_driver. The second input terminal 116 is coupled to a second switching circuit comprising second switching element Q3, and time constant circuitry comprising in an embodiment as shown capacitor C1 and a voltage divider including resistors R1, R2.

First and second switching elements Q3, Q4 may in certain embodiments be an p-channel transistor and an n-channel transistor, respectively. The drain of second switching element Q3 may be coupled to an output terminal 118 further coupled to a second driver input, wherein a modified drive supply output may be provided to the driver by the modified drive supply circuit 103 when Q3 is fully conductive. The second switching element Q3 is further associated with a threshold voltage as known in the art, wherein the second switching element Q3 turns on when an applied gate-source voltage exceeds the threshold. However, the second switching element Q3 does not yet become fully conductive, as described further below.

The time constant circuitry may be arranged with resistor R1 and capacitor C1 coupled across the gate and source of second switching element Q3, the gate of second switching element Q3 further coupled in series with resistor R2 to the drain of first switching element Q4.

Operation of the embodiment of the modified drive supply circuit 103 of FIG. 6 may now be described. As soon as the PWM controller 106 starts to generate pulse signals indicative of the predetermined condition, such as a power system soft-start condition, first switching element Q4 turns on and capacitor C1 begins charging to a voltage defined by V_driver, R1 and R2. When the voltage across the capacitor C1 reaches a threshold voltage for the second switching element Q3, the second switching element Q3 turns on as well. Since the voltage across the capacitor C1 is gradually rising (controlled by the time constant defined by R1, C1 and R2), the second switching element Q3 will on its way to a fully conductive state go through the linear conduction region where it presents significant resistance to the current drawn by the driver 108. In this way the circuitry is controlling modified drive supply output V_mds, the gate-source voltages of the synchronous rectifiers Q1, Q2, and indirectly their on-resistance as well.

In certain embodiments the time constant defined by R1, C1 and R2 are selected to fully utilize the duration of the output voltage rise time for the power device 100, 101 which, once again, means allowing the second switching element Q3 to turn on slowly by going through the linear conduction region of high on-resistance.

In the examples shown in FIGS. 4-6, the pre-biased output for the power device 100, 101 ranges from 10%-90% of the nominal output voltage for the power device 100, 101. Therefore, operation of the rectifiers Q1, Q2 should be enabled in this example only when the modified drive supply voltage V_mds reaches approximately 95% of the nominal output voltage value for the power device 100. Proper selection of the components defining the time constant, and setting a threshold voltage for the second switching element Q3 such that the second switching element Q3 does not turn on too fast, are important variables to ensuring that the rectifiers Q1, Q2 are appropriately enabled.

It may be understood that in other embodiments where the pre-biased output for the power device 100, 101 generally falls in a certain range, the modified drive supply circuit 103 generally and the threshold voltage of the second switching element Q3 in particular should be arranged to enable the rectifiers Q1, Q2 at no less than the maximum pre-biased output voltage level.

In various embodiments as shown in FIGS. 4-6, values for the voltage divider formed by V_driver, R1 and R2 are selected to ensure that enough gate-source voltage is provided for the second switching element Q3 to become fully conductive after the output voltage rise time has elapsed, and not to affect the final value of the modified drive supply voltage V_mds.

In various embodiments as shown in FIGS. 4-6, the second switching element Q3 should further be selected at least in part based on the on-resistance vs. gate-source voltage characteristic as known in the art. The ideal characteristic for selection should have an almost linearly declining slope such that significant on-resistance is ensured during the period of the time constant defined by the modified drive supply circuit 103.

Figure 7:
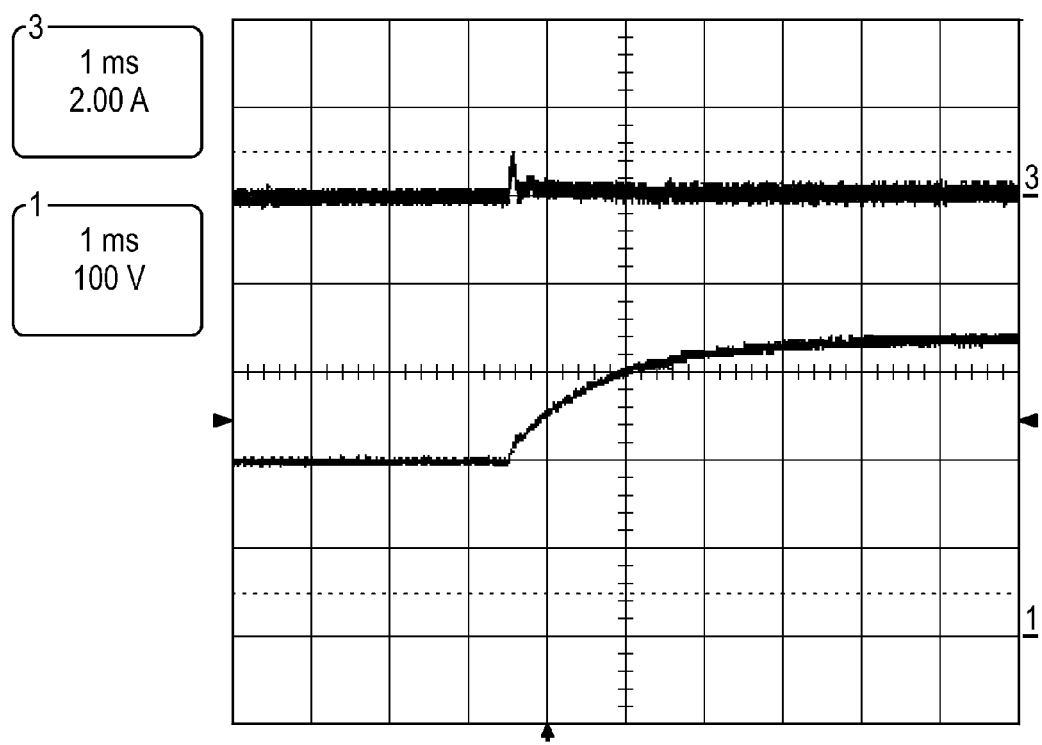
FIG. 7 is a timing diagram of waveforms of V_out and Iout for the embodiments of FIGS. 4-5 during startup into pre-biased V_out equaling 60% of nominal V_out.

Referring now to FIG. 7, test results are demonstrated for startup of the power device 100, 101 into pre-biased output voltage having a value of about 60% that of the nominal output voltage for the power device 100, 101, using the modified drive supply circuit 103 of FIG. 6. As may be seen, the negative current drawn during startup is effectively reduced or eliminated in this example.

In embodiments of the modified drive supply circuit 103 as shown in FIG. 6, an additional resistor R4 may further be coupled in parallel with the second switching element Q3 across the source and emitter of the second switching element Q3. The addition of the resistor R4 may compensate for a non-linear on-resistance vs. gate-Source voltage characteristic demonstrated by, for example, certain commonly used types of p-channel transistors.

The previous detailed description has been provided for the purposes of illustration and description. Thus, although there have been described particular embodiments of the present invention of a new and useful "Circuit for Controlling Synchronous Rectifiers during the Startup into Pre-biased Output Voltage," it is not intended that such references be construed as limitations upon the scope of this invention except as set forth in the following claims.

What is claimed is:

1. In a power system having a converter comprising an input voltage, a synchronous switching circuit, an output voltage, and a synchronous switching control circuit having a driver designed to control the state of said synchronous switching circuit, a drive supply circuit coupled to said driver for controlling said synchronous switching circuit during a predetermined condition, said driver supply circuit comprising:
   a first input terminal for receiving pulse signals indicative of the predetermined condition;
   a first switching element connected to the first input terminal and operable to turn on when the pulse signals are supplied;
   a second input terminal for receiving a driver supply input voltage;
   an output terminal for providing a driver supply output voltage to the driver;
   time constant circuitry operable to begin charging to the driver supply input voltage upon turning on of the first switching element; and
   a second switching element connected to the output terminal and to the second input terminal and having a threshold voltage, the second switching element further operable to turn on when the threshold voltage is exceeded by the charge across the time constant circuitry,
   the time constant circuitry defining a time constant associated with an output voltage rise time of the converter, and such that full conduction of the second switching element is not performed until the time constant has elapsed.

2. The circuit of claim 1, the time constant circuitry further comprising a voltage divider and a capacitor coupled to the second input terminal, the time constant defined by selected values of the voltage divider and the capacitor.

3. The circuit of claim 2, the voltage divider comprising a first resistor and a second resistor connected in series between the second input terminal and the second switching element, the first resistor further coupled in parallel with the capacitor.

4. The circuit of claim 1, the first input terminal arranged to receive pulse signals indicative of a startup condition from a pulse width modulation controller.

5. The circuit of claim 1, wherein the second switching element further comprises an on-resistance to gate-source characteristic associated with an approximately linearly declining slope.

6. The circuit of claim 1, wherein the first switching element comprises an n-channel transistor and the second switching element comprises a p-channel transistor.

7. The circuit of claim 1, the time constant associated with a rise time further associated with the output voltage for the power system.

8. The circuit of claim 1, the converter comprising an isolated converter, wherein the synchronous switching circuit further comprises two synchronous rectifiers.

9. The circuit of claim 1, the converter comprising a non-isolated converter, wherein the synchronous switching circuit further comprises a synchronous rectifier and a control rectifier.

10. Control circuitry for a power supply effective to gradually enable one or more switching rectifiers during a startup condition, the control circuitry comprising:
   a driver operable to provide control signals to each of the one or more rectifiers;
   a pulse width modulation controller operable to provide pulse signals to the driver; and
   a driver supply circuit coupled across the driver, the driver supply circuit having
      a first input connected to a first node between the driver and the pulse modulation controller and operable to receive the pulse signals provided by the pulse modulation controller,
      an output operable to provide a supply voltage to the driver, the supply voltage having an amplitude associated with the control signals provided by the driver to the rectifiers,
      a second input operable to receive a driver supply input voltage, the driver supply input voltage having an amplitude associated with the magnitude of the supply voltage, and
      driver supply control circuitry arranged to define a time constant associated with a rise time of the power supply, and further associated with a minimum allowable time between the receiving of a pulse signal from the pulse width modulation controller and the providing of the full supply voltage to the driver.

11. The control circuitry of claim 10, the driver supply control circuitry further comprising:
a first switching element connected to the first input and operable to turn on when the pulse modulation controller begins providing pulse signals;
a second switching element connected to the output and having a threshold voltage; and
wherein the time constant is further associated with the time between the turning on of the first switching element and full conduction of the second switching element.

12. The control circuitry of claim 11, the second switching element having an on-resistance to gate-source characteristic associated with an approximately linearly declining slope.

13. The control circuitry of claim 11, the second switching element selected such that the threshold voltage exceeds a predetermined percentage of a nominal power supply output, and
wherein the synchronous rectifiers are enabled when the driver supply voltage exceeds the pre-biased power supply output voltage.

14. The control circuitry of claim 11, the driver supply control circuitry further comprising
a voltage divider comprising first and second resistors connected in series to the second input, the second resistor connected between the first and second switching elements;
a capacitor connected in parallel with the first resistor; and
the time constant defined by the values of the resistors and the capacitor such that the voltage across the capacitor only exceeds the threshold of the second switching element after the time constant has elapsed.

15. A synchronous rectification control circuit for use in a power device for controlling the operation of one or more synchronous rectifiers during startup of the device into a pre-biased output voltage, comprising:
a synchronous rectification circuit including one or more synchronous rectifiers arranged to open and close based at least in part on driver control signals;
a pulse width modulation controller arranged to provide pulse signals indicative of a predetermined condition;
a driver supply circuit arranged to receive the pulse signals from the pulse width modulation controller and further arranged to receive a driver supply input signal, the driver supply circuit further arranged such that a predetermined time period passes between receiving the pulse signals and full conduction of the driver supply signal, said predetermined time period associated with an output voltage rise time for said power device;
a driver circuit arranged to receive the driver supply signal from the driver supply circuit, and further arranged to provide the driver control signals to the synchronous rectification circuit.

16. The synchronous rectification control circuit of claim 15, the predetermined condition further comprising a soft-start condition.

17. The synchronous rectification control circuit of claim 15, the driver supply circuit further comprising
a first MOSFET arranged to turn on when pulse signals are received from the pulse width modulation controller;
a capacitor arranged to begin charging when the first MOSFET is turned on; and
a second MOSFET having a threshold, the second MOSFET arranged to turn on when the charge across the capacitor exceeds the threshold.

18. The synchronous rectification control circuit of claim 17, the predetermined time period further associated with the time interval between the second MOSFET turning on and the second MOSFET becoming fully conductive.

19. The synchronous rectification control circuit of claim 18, the predetermined time period associated with selected values of the capacitor and one or more voltage dividing resistors.

* * * * *